United States Patent [19]

Janssen

[11] Patent Number: 4,682,898
[45] Date of Patent: Jul. 28, 1987

[54] METHOD AND APPARATUS FOR MEASURING A VARYING PARAMETER

[75] Inventor: John E. Janssen, Minnetonka, Minn.

[73] Assignee: Honeywell Inc., Minneapolis, Minn.

[21] Appl. No.: 741,775

[22] Filed: Jun. 6, 1985

[51] Int. Cl.$^4$ ............................................ G01K 7/04
[52] U.S. Cl. .................... 374/179; 73/866.2; 136/224; 136/228; 136/227; 374/107; 374/102; 374/181
[58] Field of Search ............... 374/102, 103, 113, 179, 374/181, 182, 29, 107; 136/224, 227, 211, 220, 222, 228; 364/557; 73/432 CR, 866.2

[56] References Cited

U.S. PATENT DOCUMENTS

| | | |
|---|---|---|
| 1,837,853 | 12/1931 | DeFlorez .............................. 136/224 |
| 2,054,120 | 9/1936 | DeFlorez .............................. 136/227 |
| 2,490,196 | 12/1949 | Beach .................................. 136/222 |
| 2,639,305 | 5/1953 | Wills .................................... 136/228 |
| 2,645,675 | 7/1953 | Arvin ................................... 136/228 |
| 2,703,335 | 3/1955 | Anorus ................................ 136/224 |
| 2,810,005 | 10/1957 | Ray ...................................... 136/220 |
| 2,978,527 | 4/1961 | Forde ................................... 136/228 |
| 3,022,669 | 2/1962 | Obrien ................................. 136/224 |
| 3,139,752 | 7/1964 | Giedt ................................... 374/135 |
| 3,744,315 | 7/1973 | Hirs ..................................... 374/101 |
| 4,494,184 | 1/1985 | Crevel ................................. 364/557 |

Primary Examiner—Steven L. Stephan
Assistant Examiner—Thomas B. Will
Attorney, Agent, or Firm—C. G. Mersereau

[57] ABSTRACT

A measuring system has a pair of sensors with the response time of one sensor lagging the response time of the other. The output of each sensor is sampled periodically and the outputs for two successive samples are compared to calculate the actual value of the parameters based upon the change in the two outputs.

4 Claims, 3 Drawing Figures

METHOD AND APPARATUS FOR MEASURING A VARYING PARAMETER

BACKGROUND OF THE INVENTION

This invention relates to a method and aparatus for improving the response time of a measuring system to changes in a measured parameter. More particularly, it relates to a system which can be ruggedly constructed yet retain its fast response.

One object of this invention is the provision of a novel method to measure the value of a time varying parameter.

Another object of this invention is of a simple, rugged measuring system which has an extremely fast response.

A still further object of the invention is the provision of a thermopile which responds quickly to changing temperatures.

SUMMARY OF THE INVENTION

Briefly, this invention contemplates a measuring system which has a pair of sensors with the response of time of one sensor lagging the response of the other. The output of each sensor is sampled periodically and the output in two successive samples is used to calculate the actual value of the parameter of interest at the time of the second sample.

For a more complete understanding of the invention, reference is hereby made to the drawings, in which:

DESCRIPTION OF THE INVENTION

Figure 1:
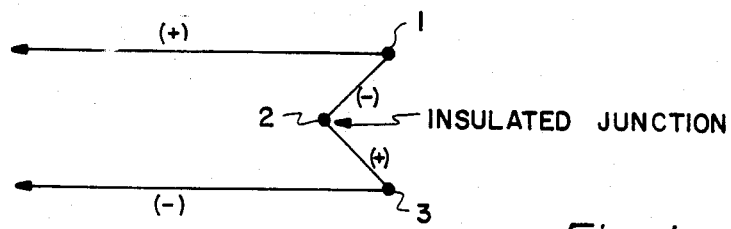
FIG. 1 is a schematic electrical drawing of an insulated junction thermocouple which electrically represents both prior art insulated junction thermocouple, and insulated junction thermocouple in accordance with the teaching of this invention.

By way of background, the temperature indicated by a thermocouple when exposed to a sudden change of temperature of its environment is given by, $$T - T_o = (T_f - T_o)(1 - e^{-t/\tau}) \quad (1)$$

where
T = sensor temp at time = t
$T_o$ = sensor temp at time = 0
$T_f$ = sensed medium temp
t = time after exposure to temperature of medium
$\tau$ = time constant of sensor Solving eq. (1) for the temperature of the fluid $T_f$, $$T_f = \frac{T - T_o e^{-t/\tau}}{1 - e^{-t/\tau}} \quad (2)$$

If the temperature of the fluid were constant over the time interval, t, and the time constant, $\tau$, of the sensor were known, eq. (2) could be used to deduce the true fluid temperature, $T_f$, from the indicated temperature, T, at the end of the time interval, t, and the indicated temperature, $T_o$, at the beginning of the time interval. In problems of interest such as the gas temperature in a gas turbine engine, the fluid temperature is not constant but can change rapidly. Thus eq. (2) represents a trivial case.

In accordance with the teachings of this invention, two sensors with differing time response are used to account for a changing fluid temperature when the rate of change is linear over the time interval, t.

The system is based upon the following relationships, where:

$T_1$ = indicated temperature of sensor no. 1 at the end of the time interval
$T_{01}$ = indicated temperature of sensor no. 1 at the beginning of the time interval
$T_2$ = indicated temperature of sensor no. 2 at the end of the time interval
$T_{02}$ = indicated temperature of sensor no. 2 at the beginning of the time interval A, B, C, and D are constants based on the time constants of the two sensors and the length of the time interval.

In terms of the indicated temperatures of sensor numbers 1 and 2, the temperature of a fluid is:

$$T_f = (AT_1 - BT_{01}) - (CT_2 - DT_{02}) \quad (3)$$

Where $$A = 1/[U_1 - (U_2 W_1/W_2)] \quad (4)$$

$$B = AX_1 \quad (5)$$

$$C = 1/[U_1 W_2/W_1) - U_2] \quad (6)$$

$$D = CX_2 \quad (7)$$

$$U_1 = 1 - e^{-t/\tau 1} \quad (8)$$

$$U_2 = 1 - e^{-t/\tau 2} \quad (9)$$

$$X_1 = 1 - U_1 \quad (10)$$

$$X_2 = 1 - U_2 \quad (11)$$

$$W_1 = \tau_1 U_1 + tX_1 \quad (12)$$

$$W_2 = \tau_2 U_2 + tX_2 \quad (13)$$

As equations (4) through (13) show, constants A, B, C, and D depend only on the time constants $\tau_1$ and $\tau_2$, and the time interval, t, between measurements. For example, consider the response of two sensors with time responses of $\tau_1 = 5$ sec. and $\tau_2 = 20$ sec. to a varying fluid temperature. Assume the fluid temperature first rises from 500° F. to 1100° F. at 20° F./min. It then falls back to 500° F. at 20° F./min. after which it rises at 40° F./min. Evaluating the sensor outputs at two second intervals, the indicated fluid temperature, $T_f$, given by eq. (3) will be equal to the true fluid temperature at the end of the first two second interval and will remain locked to the true fluid temperature thereafter. If the rate of fluid temperature change, m, were to change during a two second time interval the indicated temperature would be in error for that time interval, but would be correct at the end of the next interval.

This invention may be applied to thermistors, temperature sensing resistors, bimetal elements, vapor or liquid filled bulbs, etc. It can be used with pressure sensors, flow sensors, or any sensing application where speed of response is critical. Temperature sensing is probably most important, however, and the specific explanations and preferred embodiment will be set forth in this context.

DESCRIPTION OF A PREFERRED EMBODIMENT

Referring now to FIG. 1, work conducted at the National Bureau of Standards in the late 1940's showed that a thermocouple could be constructed of heavy wire yet still have a rapid response time if constructed as shown in the equivalent circuit drawing, FIG. 1. This so called insulated or lagged junction thermocouple has three active junctions in addition to the reference junction. When exposed to a steady temperature all three junctions are at the same temperature. In this steady state condition of EMF generated by two of the junctions cancel, so that the total EMF generated is equivalent to only one junction. However, one of the junctions is thermally insulated from ambient conditions, so that during a change in temperature, the temperature at the insulated (or lagged) junction changes more slowly than temperature at the other two junctions. Since the temperature at the lagged junction is different from the temperature at the other two junctions, it generates an additional EMF that is added or subtracted from the EMF's of the other two, resulting in a rapid increase in EMF to indicate temperature change. The indicated temperature however, overshoots the true temperature and returns to the true temperature only after an extended period. Thus, although this thermopile gives quick response, the true temperature of the fluid is usually in doubt.

Figure 2:
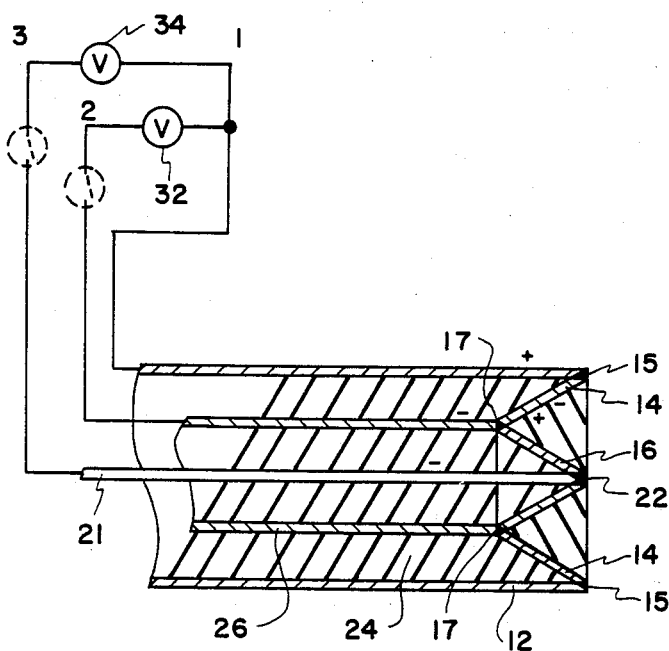
FIG. 2 is a partially electrical schematic and partially sectional mechanical drawing of one embodiment of the invention.

Referring now to FIG. 2, a thin cylinder 12 houses a frustum of a cone 14. The cylinder is made of a first suitable thermocouple material such as chromel, for example. The end of the tube 12 is joined to the base of the frustum preferably completely around their respective circumferences in a suitable manner known in the art, such as by electron beam welding. This forms a first thermocouple junction 15.

The frustum 14 is made from a second thermocouple material, such as alumel.

The base of a cone 16 is joined to the top of frustum to form a second circumferential thermocouple junction 17. The cone 16 is preferably of the same material as the cylinder, chromel in this example. Similarly junction 17 may be formed by electron beam welding.

The apex of the cone advantageously lies in or close to the plane end of the cylinder 12, and a wire 21 joined to the apex of the cone forms a third junction 22. The wire is preferably of the same material as the frustum 14.

An insulating material (both thermal and electrical) 24 fills the end of the cylinder and surrounds the junction 17. A tube 26 coaxial with the cylinder 12 is connected to the insulated junction 17. Tube 26 is advantageously of the same material as the frustum. As will be appreciated by those skilled in the art, the thermocouple is completed by connections between the outer cylinder 12, the tube 26, and wire 21.

In operation the end of the cylinder is exposed to an ambient temperature so that junctions 15 and 22 are always at the same temperature. The insulated junction 17 is at this same temperature under steady state condition, and its EMF cancels the EMF of one of two other junctions. In response to a change in temperature, the temperature at the lagged junction is different than the temperature at the two other junctions so that the EMFs do not completely cancel, resulting in a relatively rapid rise in EMF due to a temperature change.

A pair of high impedance volt meters 32 and 34 can be used to periodically measure the outputs of the leading and lagging sensor and these values used to calculate the temperature of the medium in contact with the thermopile in accordance with eq. 3 above. It should be noted the thermal circuits are not electrically isolated so that care must be used in measuring the voltage. Either a high impedance volt meter or a switch, or both should be used to eliminate errors.

Figure 3:
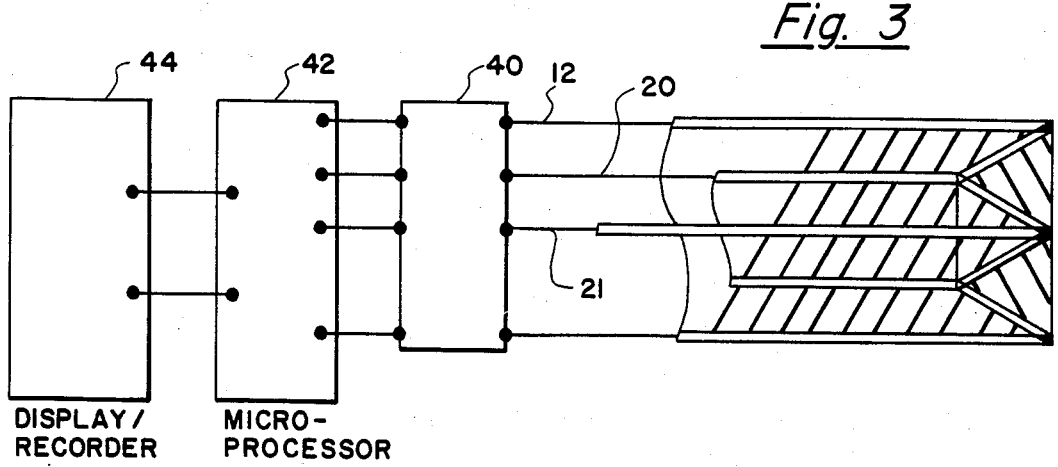
FIG. 3 is a partial block diagram and a partial sectional view illustrating an alternate embodiment of the invention.

Referring now to FIG. 3, the thermopile is the same as that described in connection with FIGS. 1 and 2. An analogue to digital converter 40 receives the output signals from the thermopile. Converter 40 samples the output of the thermopile and converts them to a digital signals which are coupled as inputs to a microprocessor 42. Microprocessor 42 repeatedly calculates the temperature using eq. 3 and displays the value on a recorder 44 or provides output to any suitable utilization known in the art.

It should be noted that as part of its routine, in the embodiment shown, the microprocessor 42 can for each sample establish the leading temperature, $T_A$, and the lagging temperature, $T_B$, from potential between the outer cylinder 12 and the central wire 21 ($V_{1-3}$), and between the outer cylinder 12 and tube 26 ($V_{1-2}$). Thus:

$$T_A = V_{1-3} - V_{1-2} \tag{14}$$

$$T_B = T_A - V_{1-2} = V_{1-3} - 2V_{1-2} \tag{15}$$

The temperatures, $T_{01}$ and $T_{02}$, at the beginning of each time interval are the final temperatures, $T_1$ and $T_2$, for the previous time interval. The sensor temperatures should be measured at the same time. Thus if a switching technique is used with a lagged junction thermopile, the switching time must be short compared with the time interval, t.

Those skilled in the art will recognize that only the preferred embodiment of the present invention is disclosed herein and that the embodiment may be altered and modified without departing from the true spirit and scope of the invention as defined in the accompanying claims.

What is claimed is:

1. A system for measuring a varying parameter comprising in combination:
   a thermopile having a first and a second circumferential junction, one point junction, and means to thermally insulate said first circumferential junction relatively to said other two junctions; said first circumferential junction producing a first output signal;
   said second circumferential junction and said point junction producing a second output signal;
   means for periodically sampling said first and second output signals; and
   means responsive to said first and second output signals at the beginning and end of a sample;
   said responsive means producing an output signal which is a function of the difference between a change in said first output signal between the beginning and end of said sample period and the change in said second output signal between the beginning and end of said sample period.

2. A thermopile is in claim 1 wherein said point junction lies substantially in the plane of said second circumferential junction.

3. A thermocouple comprising in combination a cylinder having first and second ends and made of a first electrically conductive material;
   a first cone having a base and a frustum made of a second electrically conductive material joined at its base to said first end of said cylinder with the top of said frustum within said cylinder;
   a second cone having a base and a point, said second cone made of said first conductive material and joined at its base to the top of said frustum with the point of said second cone located approximately in the plane of said first end of said cylinder; and
   a conductor of said second conductive material extending through said cylinder and joined to said point of said second cone, and insulation surrounding the junction of said frustum and said cone.

4. A thermocouple junction as in claim 3 further including a conductive tube within said cylinder connected to the junction of said frustum and said base of said second cone.

* * * * *